United States Patent [19]

Halpern

[11] 3,886,268

[45] May 27, 1975

[54] IODOPHOR-STEROID COMPOUND PHARMACEUTICAL COMPOSITIONS

[75] Inventor: Alfred Halpern, Great Neck, N.Y.

[73] Assignee: Synergistic, New York, N.Y.

[22] Filed: Mar. 29, 1974

[21] Appl. No.: 456,333

Related U.S. Application Data

[63] Continuation-in-part of Ser. No. 257,505, May 30, 1972, abandoned.

[52] U.S. Cl. ............... 424/80; 260/88.3; 424/243
[51] Int. Cl. ..................... A61k 17/00; A61k 27/12
[58] Field of Search ............. 424/80, 243; 260/88.3

[56] References Cited
UNITED STATES PATENTS

| | | | |
|---|---|---|---|
| 2,861,920 | 11/1958 | Dale et al. | 424/80 |
| 2,897,120 | 7/1959 | Cronin et al. | 424/80 X |
| 3,062,712 | 11/1962 | Dale et al. | 424/80 |
| 3,190,855 | 6/1965 | Miki | 260/63 |
| 3,671,545 | 6/1972 | Halpern | 260/326.5 FL |
| 3,751,565 | 8/1973 | Santorelli | 424/80 |
| 3,764,669 | 10/1973 | Santorelli | 424/80 |

FOREIGN PATENTS OR APPLICATIONS

| | | |
|---|---|---|
| 1,319,413 | 6/1973 | United Kingdom |
| 2,166,215 | 5/1973 | United Kingdom |

OTHER PUBLICATIONS

Kohn et al.; J. Pharm. Scl. 52(12):1126, Dec. 1963, "Antibacterial Agents Not Presently Employed As Preservatives in Ophthalmic Preparations Found Effective Against Pseudomonas Auruginosa". (PVP–Iodine).

Higuchi et al.; J. Am. Pharm. Assoc. Scl. Ed.43:3-98–401, July 1954, "Study of Possible Complex Formation Between Macromolecules and Certain Pharmaceuticals I". (PVP–Cortisone).

GAF (1967), PVP–An Annotated Bibliography 1951–1966, Vol. I, 53, pp. esp. pp. 17–19, "Chemical Complexes" Mfg. Brochure.

GAF (1967), PVP–An Annotated Bibliography 1951–1966, Vol. II, 51 pp. esp. pp. 15–20 "PVP–Iodine" Mfg. Brochure.

*Primary Examiner*—Shep K. Rose
*Attorney, Agent, or Firm*—Wolder & Gross

[57] ABSTRACT

Iodophor-steroid complex compounds and composition employing the same, exhibiting synergistic anti-inflammatory action, greater than the sum of the anti-inflammatory potency of the respective moieties. Methods for the preparation and use of the aforesaid iodophorsteroid complex compounds in the treatment of inflammatory, dermatologic disease are described.

31 Claims, No Drawings

IODOPHOR-STEROID COMPOUND PHARMACEUTICAL COMPOSITIONS

This application is a continuation-in-part application of applicant's co-pending application, Ser. No. 257,505, filed May 30, 1972, now abandoned.

This invention relates to synergistic, anti-inflammatory iodophor-steroid complex compounds, pharmaceutical compositions employing the same and methods for their use in the treatment of inflammatory skin disease of humans and animals. In particular, it relates to a new molecular complex compound formed between polyvinylpyrrolidone-iodine and an anti-inflammatory steroid compound, as for example, cortisone, cortisone acetate, hydrocortisone, hydrocortisone acetate, prednisone, prednisone acetate, prednisolone and prednisolone acetate, said new compound complexes possessing an increased topical anti-inflammatory potency which is greater than the sum of topical anti-inflammatory activity determined for the respective component moities when these are used alone.

It is an object of this invention to describe a method for preparation of the synergistic iodophor-steroid complexes and compositions employing the same, as well as to describe a method for treating inflammatory skin diseases utilizing the aforesaid compositions.

When a steroid anti-inflammatory compound is applied to the skin during therapy of inflammatory skin diseases, certain inherent defects limit the therapeutic utility of these compounds. It is known for example, that increased anti-inflammatory activity renders the skin more sensitive to infection and presents a serious threat to the patient unless adequate antimicrobial procedures are employed. Thus, when a steroid anti-inflammatory compound is intended to be used in treating dermatologic disease of humans and animals, which is complicated by infection, good germicidal activity must be present together with the anti-inflammatory action in order to avoid a septic state.

Of the antiseptic agents utilized to counteract surface infections, iodine is considered to be one of the best germicidal agents because of its broad spectrum, rapid microbicidal action against virtually every species of micro-organism. However, elemental iodine is a strong corrosive, oxidative halogen compound that interacts with many organic substances as well as to possess noxious toxicologic and pharmacologic properties when applied to the skin. When elemental iodine comes in contact with an anti-inflammatory steroid compound, oxidative degradation of the steroid compound results so that the anti-inflammatory potency of the composition is greatly reduced and, in many cases, even eliminated. Elemental iodine stains the skin, causes burning and local tissue irritation and preparations containing elemental iodine cannot be bandaged. These and other well known chemical and toxicologic incompatibilities have prevented the formulation of a steroid compound with elemental iodine into pharmaceutical preparations for use in the treatment of infected inflammatory skin disease.

Recent years witnessed great advances in eliminating certain of the limitations of elemental iodine as a germicide. The introduction of polyvinylpyrrolidone-iodine marked a great step forward in avoiding the noxious toxicologic properties associated with iodine. Polyvinylpyrrolidone-iodine is a well known compound (see National Formulary XIII, page 581, (1970), and is widely used for its germicidal properties because it retains the broad microbiologic spectrum of elemental iodine but avoids its harmful tissue properties. The desirable germicidal properties of polyvinylpyrrolidone-iodine are due to its available iodine content, which chemically is elemental iodine. Thus, it would be expected that the well known chemical incompatibility between a steroid anti-inflammatory compound and elemental iodine would remain when polyvinylpyrrolidone-iodine is used in combination with a steroid compound, although the harmful toxic effects of iodine would be avoided. However, it was unexpectedly found that when an iodophor compound, as for example, polyvinylpyrrolidone-iodine, is combined with a steroid anti-inflammatory compound, as for example, cortisone, cortisone acetate, hydrocortisone, hydrocortisone acetate, prednisone, prednisone acetate, prednisolone and prednisolone acetate, that a new molecular complex compound is formed which possesses both anti-inflammatory and germicidal properties. The molecular complex formed between said steroid compound and said iodophor compound does not exhibit the oxidative degradation of the steroid moiety, such as is known to occur for steroids in the presence of iodine and for the first time, stable pharmaceutical dosage forms which are useful in the treatment of inflammatory skin disease may be prepared to provide concurrent anti-inflammatory and germicidal activity.

When the new iodophor-steroid compound is subjected to stability control testing, either in its pure form or when combined with a pharmaceutically acceptable non-toxic carrier, we find significant differences in the stability of the new iodophor-steroid compound and compositions containing the same, when these are compared to the behavior of a mixture of the separate components.

In an experiment to determine the comparative stability of the new compound, polyvinylpyrrolidone-iodine-hydrocortisone acetate molecular complex compound, its separate components, as for example, polyvinylpyrrolidone-iodine and hydrocortisone acetate and a mixture of elemental iodine and hydrocortisone acetate were subjected to ambient room temperature storage for a period of two years, the samples were stored as the dry powder in glass vials. The respective samples were analyzed for available iodine content and hydrocortisone acetate content as specified intervals and the respective analyses compared to the initial values. The results of this test is described in Table I, and establishes that the new molecular complex, polyvinylpyrrolidone-iodine-hydrocortisone acetate compound is stable when stored for two years at room temperature whereas a mixture of iodine and hydrocortisone acetate showed marked decomposition within one month.

In a second experiment, a pharmaceutical solution containing 10% of polyvinylpyrrolidone-iodine-hydrocortisone acetate molecular complex was compared to a mixture of a solution of iodine and hydrocortisone acetate. The concentration of the respective moieties was adjusted to be equivalent to the molecular proportions of iodine and hydrocortisone acetate present in the newly formed complex compound, polyvinylpyrrolidone-iodine-hydrocortisone acetate. The respective solutions were aged in a temperature-controlled oven set at 37°C. ± 2°C. and assayed at determined intervals of 1 day, 3 days, 6 days, and 10 days. The results of this test are reported in Table II and established that polyvinylpyrrolidone-iodine-hydrocortisone acetate is stable whereas a total degradation of the hydrocortisone acetate and in iodine content occurred with the mixture which made the mixture unsatisfactory for pharmaceutical use.

In still another experiment, pharmaceutical compositions containing the new steroid compound complex were compared to similar pharmaceutical compositions prepared with a mixture of iodine and the respective steroid compound as to their storage stability. The respective pharmaceutical dosage forms tested were powders and ointments. The same inert pharmaceutically acceptable vehicles were used for preparing the respective test preparations. The respective samples were assayed at 1 month, 3 months, 6 months and 12 month intervals. The results reported in Table III demonstrate that the new polyvinylpyrrolidone-iodine-hydrocortisone acetate compound complex when compounded into an ointment dosage form or a powder form, is stable for a period of one year whereas mixtures of the component moieties compounded in the same molecular proportion in the same vehicle, showed marked degradation of the steroid and iodine content.

TABLE 1

THE STABILITY OF POLYVINYLPYRROLIDONE-IODINE-HYDROCORTISONE ACETATE COMPOUND AND ITS COMPONENTS WHEN STORED AT ROOM TEMPERATURE[a]

| COMPOUND | Initial | | 1 month | | 6 months | | 12 months | | 18 months | | 24 months | |
|---|---|---|---|---|---|---|---|---|---|---|---|---|
| | $I_2$/mg./gm. | HCA/mg./gm. | $I_2$/mg./gm. | HCA/mg./gm. | $I_2$/mg./gm. | HCA/mg./gm. | $I_2$/mg./gm. | HCA/mg./gm. | $I_2$/mg./gm. | HCA/mg./gm. | $I_2$/mg./gm. | HCA/mg./gm |
| Polyvinylpyrrolidone-Iodine hydrocortisone acetate, molecular complex compound | 10 mg. | 10 mg. | 9.8 mg. | 10 mg. | 9.4 mg. | 9.9 mg. | 9.2 mg. | 9.7 mg. | 8.9 mg. | 9.4 mg. | 8.8 mg. | 9.4mg. |
| Polyvinylpyrrolidone-Iodine | 10 mg. | — | 9.7 mg. | — | 9.6 mg. | — | 9.2 mg. | — | 9.1 mg. | — | 9.2 mg. | — |
| Hydrocortisone acetate | — | 10 mg. | — | 10.1 mg. | — | 9.8 mg. | — | 9.4 mg. | — | 9.1 mg. | — | 9.2mg. |
| Elemental Iodine and hydrocortisone acetate, mixture | 10 mg. | 10 mg. | 6.0 mg. | 5.3 mg. | 0.3 mg. | 4.3 mg. | — | — | — | — | — | — |

$I_2$ = available iodine content determined by method described in National Formulary, Edition XIII, page 581, (1970).
HCA = amount of hydrocortisone acetate determined by method described in The United States Pharmacopeia, Revision XVIII, page 306, (1970), for hydrocortisone acetate.
[a]stored as the dry powder in a stoppered vial.

TABLE II

THE EFFECT OF MOLECULAR COMPLEXING ON HYDROCORTISONE ACETATE STABILITY AND AVAILABLE IODINE LEVELS UNDER ACCELERATED ELEVATED TEMPERATURE AGING AT 37°C.

| Aging Period | Polyvinylpyrrolidone-Iodine hydrocortisone acetate[a] | | Solution of iodine and hydrocortisone acetate[b] | |
|---|---|---|---|---|
| ASSAY | $I_2$ mg./gm. | HCA mg./gm. | $I_2$ mg./gm. | HCA mg./gm. |
| Initial | 10.0 | 10.0 | 10.0 | 10.0 |
| Day 1 | 10.0 | 10.0 | 4.1 | 2.3 |
| Day 3 | 9.2 | 10.0 | (c) | (c) |
| Day 6 | 8.8 | 9.3 | (c) | (c) |
| Day 10 | 8.8 | 9.4 | (c) | (c) |

$I_2$ = available iodine content determined by method described in National Formulary, Edition XIII, page 581, (1970).
HCA = amount of hydrocortisone acetate determined by method described in The United States Pharmacopeia for hydrocortisone acetate, Revision XVIII, page 306, (1970).
[a]Prepared with the product of Example I.
[b]Adjusted to conform in concentration of respective moieties to that of the compound of Example I.
(c)No available iodine content and no hydrocortisone acetate were found by the methods described above.

TABLE III

THE EFFECT OF MOLECULAR COMPLEXING ON HYDROCORTISONE ACETATE STABILITY AND IODINE LEVELS IN PHARMACEUTICAL COMPOSITIONS STORED AT ROOM TEMPERATURE

| COMPOSITION | Initial | | 3 months | | 6 months | | 12 months | |
|---|---|---|---|---|---|---|---|---|
| | $I_2$ mg./gm. | Steroid mg./gm. | $I_2$ mg./gm. | Steroid mg./gm. | $I_2$ mg./gm. | Steroid mg./gm. | $I_2$ mg./gm. | Steroid mg./gm. |
| Polyvinylpyrrolidone-Iodine[a] hydrocortisone acetate ointment | 10.0 | 10.0 | 9.8 | 10.0 | 9.7 | 10.0 | 9.2 | 9.6 |
| Iodine and hydrocortisone[b] acetate ointment | 10.0 | 10.0 | 1.2 | 2.0 | 0 | 0 | 0 | 0 |
| Polyvinylpyrrolidone-Iodine-cortisone acetate ointment[a] | 10.0 | 10.0 | 9.6 | 10.0 | 9.8 | 10.0 | 9.7 | 9.9 |
| Iodine and cortisone acetate ointment[c] | 10.0 | 10.0 | 2.3 | 4.1 | 0 | 0 | 0 | 0 |
| Polyvinylpyrrolidone-iodine[d] prednisolone acetate powder | 10.0 | 10.0 | 9.8 | 9.6 | 9.8 | 9.4 | 9.6 | 9.5 |
| Iodine and prednisolone[e] acetate powder | 10.0 | 10.0 | 0 | 0 | 0 | 0 | 0 | 0 |

TABLE III – Continued

THE EFFECT OF MOLECULAR COMPLEXING ON HYDROCORTISONE ACETATE STABILITY AND IODINE LEVELS IN PHARMACEUTICAL COMPOSITIONS STORED AT ROOM TEMPERATURE

| COMPOSITION | Initial | | 3 months | | 6 months | | 12 months | |
|---|---|---|---|---|---|---|---|---|
| Polyvinylpyrrolidone-Iodine[(a)] hydrocortisone acetate powder | 10.0 | 10.0 | 10.0 | 10.0 | 10.0 | 9.9 | 9.6 | 9.8 |
| Iodine and hydrocortisone[(c)] acetate powder | 10.0 | 10.0 | 0 | 0 | 0 | 0 | 0 | 0 |

$I_2$ = available iodine content determined by method described in National Formulary, Edition XIII, p. 581 (1970).
Steroid = the respective steroid moiety was assayed by the respective United States Pharmacopeia or National Formulary Method. [(a)]prepared in accord with Example 3; [(b)]prepared to conform in weights and vehicle to Example 3, but utilizing elemental iodine and hydrocortisone acetate in admixture [(c)]prepared in accord with Example 3 as to equivalent weights and vehicle. Elemental iodine and cortisone acetate in admixture were the active agents; [(d)]prepared as set forth in Example 9; [(e)]prepared as set forth in Example 9 but with elemental iodine and prednisolone acetate or hydrocortisone acetate serving as active ingredients.

On the basis of the above described studies, it is concluded that polyvinylpyrrolidone-iodine forms a molecular complex with a steroid compound, as for example, hydrocortisone acetate, hydrocortisone, cortisone, cortisone acetate, prednisone, prednisone acetate, prednisolone and prednisolone acetate which avoid the known oxidative degradation occuring when iodine is brought into contact with a steroid compound. Thus, although it is well known that polyvinylpyrrolidone-iodine releases available iodine which has all the chemical properties of elemental iodine, and that elemental iodine will act as a potent oxidizing degradative substance to steroid compounds, the newly formed polyvinylpyrrolidone-iodine-steroid complex compound resists such degradative oxidative changes to preserve the anti-inflammatory and antiseptic properties of the compound upon storage in both the isolated pure form, as well as in the form of a pharmaceutical composition when the new compound is combined with a carrier.

Further proof of the formation of a molecular complex between the moieties of the new compound is seen in the change in aqueous solubility of hydrocortisone acetate in the presence of polyvinylpyrrolidone-iodine. Thus, it is known that hydrocortisone acetate is soluble in water to the extent of 1 mg. per 100 ml., but when polyvinylpyrrolidone-iodine-hydrocortisone acetate is dissolved in water, the hydrocortisone acetate moiety is now rendered significantly more soluble to form stable solutions up to about 20 mgs. per 100 ml. When the concentration of polyvinylpyrrolidone-iodine in relationship to that of hydrocortisone acetate is decreased, there is a corresponding decrease in the solubility of the hydrocortisone acetate, so that when the concentration of polyvinylpyrrolidone-iodine per 100 ml. is below 1 percent, we find that the change in aqueous solubility of hydrocortisone acetate is now appreciably altered and the solubility limis of hydrocortisone acetate is 1.03 mg. per 100 ml.

Still another change in physical properties of hydrocortisone acetate occurs when it is combined with polyvinylpyrrolidone-iodine to form a new compound which is indicative of complex formation. It is known that hydrocortisone acetate when dissolved in concentrated sulfuric acid causes a green fluorescence. This fluorescence is absent when a concentration of polyvinylpyrrolidone-iodine equal in weight to the weight of hydrocortisone acetate is added to the concentrated sulfuric acid in which the hydrocortisone acetate is dissolved.

Thus, the proof of new compound formation between polyvinylpyrrolidone-iodine and hydrocortisone acetate is readily established on the basis of:

a. The resistance of steroid moiety to oxidative degradation by elemental iodine.

b. The resistance of elemental iodine against reductive degradation by the steroid moiety.

c. The preservation of both germicidal and antiinflammatory properties for the new complex compounds.

d. The increase in aqueous solubility of a steroid, i.e., hydrocortisone acetate in the presence of polyvinylpyrrolidone-iodine.

e. The absence of the characteristic green fluorescence of a steroid, i.e., hydrocortisoneacetate when the new complex molecule, polyvinylpyrrolidone-iodine-hydrocortisone acetate is dissolved in concentrated sulfuric acid.

Corresponding modification of the applicable properties of the respective steroid moiety described above were obtained when the new complex compound was prepared with polyvinylpyrrolidone-iodine and a steroid selected from the group consisting of cortisone, cortisone acetate, hydrocortisone, prednisone, prednisone acetate, prednisolone and prednisolone acetate.

It was further unexpectedly found that the new iodophor-steroid compound complex possessed an improved anti-inflammatory potency that was greater than the sum of the individual anti-inflammatory potencies determined for the separate components. Thus, the bio-assay of anti-inflammatory properties reveals a vastly increased potency for said new molecular compound over the values determined for the individual components to establish a synergism.

The alpha-2-glycoprotein immunoassay for anti-inflammatory activity of both steroid and non-steroid compounds, is a sensitive, accurate and rapid assay procedure that lends itself to both qualitative and quantitative evluations. This test has been well documented in scientific literature and has been accepted as a reliable method for ascertaining anti-inflammatory activity both qualitatively and quantitatively. (Endocrinology 82: 1093–1097, 1968; Fed. Proc. 29 (2): 419, 1970; Endocrinology 82: 1085–1092, 1968 and Proc. Amer. Assoc. Cancer Res. 3:305, 1962).

In the case of steroids, and more specifically, the natural and synthetic 11-oxy-corticosteroids, anti-inflammatory activity is measured by an increase in serum alpha-2-glycoprotein levels. Non-steroids, on the other hand, such as aspirin, phenylbutazone and indoxole, influence alpha-2-glycoprotein synthesis in a dose-response relationship. The anti-inflammatory activity of these compounds is measured, therefore, by a decrease in serum alpha-2-glycoprotein levels from that determined for the untreated controls. This difference of effect of the serum alpha-2-glycoprotein response between steroids and non-steroids, has been utilized to obtain maximal assay of sensitivity and response.

As a result of injury to connective tissue, or during the initial phases of an acute inflammatory reaction, there is release and/or synthesis of a humoral initiator substance, designated as "HIS". The amount of "HIS" released is dependent upon the amount of tissue involved. Upon reaching the liver, HIS initiates alpha-2-glycoprotein synthesis in the presence of endogenous glucocorticoid, the hepatic response being a quantitative expression of the amount of HIS perfusion.

It has been postulated that alpha-2-glycoprotein is carried through the blood stream to the site of injury and is utilized in the initial phases of granuloma tissue formation. The administration of exogenous glucocorticoids, topically or parenterally, superimposed on already high endogenous levels, resulting from the stress of trauma, causes an inhibition of anabolic processes, and alpha-2-glycoprotein therefore is not incorporated into granuloma tissue but accumulates in the plasma in a dose-related phenomenon.

The anti-inflammatory non-steroid compounds as exemplified by aspirin, on the other hand, apparently act at the site of trauma inhibiting HIS release with a resultant depression of serum alpha-2-glycoprotein levels as compared to untreated controls. This is further supported by the effectiveness of alpha-2-glycoprotein responce as a sensitive and quantitative indicator of the anti-inflammatory activity of topically applied salicylates.

When this test for anti-inflammatory activity was applied to the subject new iodophor-steroid compound complex and the results compared with a side-by-side study of respective components, it was found that the subject new compound, polyvinylpyrrolidone-iodine-hydrocortisone acetate caused an increase in the level of serum alpha-2-glycoprotein of 132 percent over the placebo control, while 1 percent hydrocortisone acetate in the same vehicle induced only a 39 percent increase over the placebo control level. The results of this test establish that the new compound, polyvinylpyrrolidone-iodine-hydrocortisone acetate compound complex, causes an increased alpha-2-glycoprotein level greater than the sum of values determined for the separated components, to result in a synergistic action for the new compound.

To achieve the aforesaid synergistic increase in anti-inflammatory properties for the combination of an iodophor with the steroid, from 1 to 10 parts by weight of iodophor compound is combined with each 1/10 part to 5 parts by weight of the steroid compound, and a preferred composition contains 10 parts by weight of iodophor compound for each part by weight of steroid compound.

Although undiluted combination of active compounds may be utilized in therapy by direct application to the skin of humans and animals, it is preferred that the combination of iodophor and anti-inflammatory agent be compounded with a suitable pharmaceutically acceptable carrier. Such carriers as a polyethylene glycol having a molecular weight of from 200 to 6000; hydrophilic and lipophilic ointment bases, propylene glycol, glycerin and mixtures of the same and talc, starch and magnesium stearate are examples of suitable pharmaceutically acceptable carriers. When preparing solid pharmaceutical compositions containing the new iodophor-steroid compounds, either simple levigagation or milling may be utilized to uniformly disperse the active ingredients in the carrier.

The new pharmaceutical compositions comprising the anti-inflammatory iodophor compound may be used to treat a broad range of inflammatory skin diseases and topical infections wherein a germicidal anti-inflammatory and/or anti-pruritic action is desired. Such dermatologic entities as contact dermatitis, atopic dermatitis, eczema, infective dermatitis, stasis dermatitis, lichen simplex chronicus, anogenital prurities, intertrigo and bacterial and mycotic infections of the skin are readily controllable through the application of the new compounds or pharmaceutical compositions containing the new molecular complex steroid-iodophor compounds, from one to six times daily, depending upon the patient's needs. Such therapeutic use has been found to be non-irritating to the skin and the affected area may be bandaged despite the presence of an iodine-containing germicidal compound.

The following examples describe the present invention but it is not intended to be limited thereby.

EXAMPLE 1

In a suitable glass reaction vessel, fitted with an inlet tube and a stirrer is placed a solution of 12 gm. of polyvinylpyrrolidone-iodine dissolved in 50 ml. of ethanol. The stirring is started and the mixture warmed to 50°C., whereupon 1 gm. of hydrocortisone acetate is added. The stirring continues until a clear, homogenous solution is obtained and the pH of the solution is adjusted to be between pH 4 and pH 6. After four hours of stirring, while warming, the solution is cooled to room temperature, allowed to stand overnight and the solvent distilled to one-third of the original volume whereupon a solid, amber colored powder separates. The whole is then set aside in an ice-chest and the separated solid material filtered, washed with small portions of cold, dried acetone and cold, absolute alcohol, and the powder dried in a vacuum.

The isolated formed new compound, polyvinylpyrrolidone-iodine-hydrocortisone acetate, is an amber colored amorphous powder, soluble in water and alcohol but insoluble in chloroform, acetone and petroleum ether. The aqueous solubility of polyvinylpyrrolidone-iodine-hydrocortisone acetate complex compound, at 25°C., is 44.3 mg. per 100 ml. When the new compound is treated with chloroform, iodine is not extracted and when suspended in acetone, there is no extraction of the hydrocortisone acetate moiety. The iodine content of the new molecule is 32.8 percent, which is in good agreement with the calculated theoretical value of 31.4 percent. The percentage concentration of hydrocortisone acetate in the new molecule is 53.4 percent by weight, which is in good agreement with its theoretical value of 52.6 percent. When the polyvinylpyrrolidone-iodine-hydrocortisone acetate is dissolved in concentrated sulfuric acid, the green fluorescence, as is well known to occur with hydrocortisone acetate, no longer is present.

EXAMPLE 2

In place of the hydrocortisone acetate described in Example 1 above, there may be substituted in stoichiometric equivalent amounts, such steroid compounds as cortisone, cortisone acetate, hydrocortisone, prednisone, prednisone acetate, prednisolone, prednisolone acetate, the remainder of the steps being the same and the properties of some of the respective formed new molecular complex compounds isolated are:

a. Polyvinylpyrrolidone-iodine-cortisone, an amber colored amorphous powder, soluble in water to the extent of 38 mg. per 100 ml. but insoluble in acetone and petroleum ether. The compound does not reduce ammoniacal silver nitrate solution at room temperature in contrast to cortisone, per se. The melting point of polyvinylpyrrolidone-iodine-cortisone is over 280°C., with decomposition.

b. Polyvinylpyrrolidone-iodine-cortisone acetate is soluble in water to the extent of 30 mg. per 100 ml. and melts with decomposition above 210°C.

c. Polyvinylpyrrolidone-iodine-hydrocortisone is soluble in water to the extent of 16 mg. per 100 ml. and does not cause a green fluorescence when dissolved in concentrated sulfuric acid. The new compound does not reduce alkaline silver nitrate solution as does hydrocortisone.

d. Polyvinylpyrrolidone-iodine-prednisone is soluble in water to the extent of 12 mg. per 100 ml. and melts at 246°C., with decomposition.

e. Polyvinylpyrrolidone-iodine-prednisone acetate melts at 210°C., with decomposition.

f. Polyvinylpyrrolidone-iodine-prednisolone melts at 265°C., with decomposition.

g. Polyvinylpyrrolidone-iodine-prednisolone acetate is soluble in water to the extent of 8 mg. per 100 ml. and melts at 221°C., with decomposition.

EXAMPLE 3

In a tared, suitable container is placed 70 gm. of polyethylene glycol-1000 which is carefully melted and while maintaining the warming temperature to be just above the solidification point of the polyethylene glycol-1000 compound, 11 gms. of polyvinylpyrrolidone-iodine-hydrocortisone acetate and 8 ml. of distilled water are added and the whole stirred until a uniform distribution is achieved. The weight of the composition is now determined and brought up to final weight of 100 gm. with distilled water. The composition is now cooled to room temperature and packaged in unit dosage form, if desired. The resulting composition may be used with great advantage in dermatologic therapy to treat infected inflammatory skin disease.

EXAMPLE 4

In a suitable vessel is placed 52.7 gms. of polyethylene glycol-400; 8.3 gms. of polyethylene glycol-4000 and 16.9 gms. of polyethylene glycol-6000. The polyethylene glycols are melted and to this is added 10 ml. of deionized water. The mixture is stirred and set aside to cool.

With rapid stirring, 10 gms. of polyvinylpyrrolidone-iodine is added and the pH adjusted to between pH 4.5 and pH 6. One gram of hydrocortisone acetate is then added and the whole milled until a uniform dispersion is achieved. The resultant composition may be used in dermatologic therapy or may be packaged into individual single dose units.

EXAMPLE 5

In place of the hydrocortisone acetate utilized in Examples 1 through 4 above, there may be substituted in equal parts by weight a steroid compound as for example, cortisone, cortisone acetate, hydrocortisone, prednisone, prednisone acetate, prednisolone and prednisolone acetate. While a preferred ratio between iodophor compound and steroid compound is 10 parts by weight of iodophor compound for each part by weight of steroid compound, the range in concentration useful to achieve the synergistic effect is from 1 part to 10 parts by weight of iodophor for each 1/10 part to 5 parts by weight of the selected steroid compound. The exact ratio of iodophor compound to steroid will be determined by the patient's needs and the compounds preferred. The remainder of the steps are the same.

EXAMPLE 6

In place of the polyethylene glycols described in Examples 1 through 5 above, there may be substituted in equal parts by weight, the following compounds:

a. For polyethylene glycol-400: a liquid polyethylene glycol compound having a molecular weight of from 200 to 800, glycerine, propylene glycol and mixtures of the same.

b. For polyethylene glycol-4000 and polyethylene glycol-6000: a solid polyethylene glycol, having a molecular weight of from between 1000 and 6000 molecular weight, and mixtures of the same.

The remainder of the steps remain the same.

EXAMPLE 7

To 100 gms. of propylene glycol is added 5 gms. of prednisolone acetate and the mixture is warmed until solution is achieved. Twenty ml. of a 10 percent aqueous solution of polyvinylpyrrolidone-iodine is then added and the mixture stirred until a homogenous preparation results. The resultant product is suitable to treat humans and animals presenting dermatologic disease complicated by infection wherein an anti-inflammatory effect is desired.

It may be desired to substitute in equivalent weight, glycerin or a polyethylene glycol having a molecular weight of between 200 and 800 or mixtures of the same for all or part of the propylene glycol used above.

EXAMPLE 8

To 50 gms. of glycerin is added 2 gms. of hydrocortisone and 10 gms. of polyvinylpyrrolidone-iodine. The mixture is stirred until solution is achieved and the resultant product is suitable for use in the treatment of dermatologic disease complicated by infection wherein an anti-inflammatory effect is desired. It may be desired to substitute an equivalent weight of propylene glycol or a polyethylene glycol having a molecular weight of between 200 and 800 for all or part of the glycerin used above.

EXAMPLE 9

When it is desired to utilize the pharmaceutical dosage form, powders, in the treatment of dermatologic disease requiring antiseptic-anti-inflammatory therapy, then an iodophor-steroid molecular complex compound such as is described in Examples 1 and 2 above, may be combined with a pharmaceutically acceptable powder vehicle, as for example, talc, starch or magnesium stearate. The iodophor-steroid complex compound may also be formed, in situ, in the course of preparing the powder unit dosage form in which case the following procedure may be used:

Fifty grams of talc, pharmaceutical grade, are moistened with 50 percent ethanol and a solution of 1 gm. of hydrocortisone acetate in 20 ml. of 70 percent ethanol is added. The whole is stirred until a uniform distribution results. A solution of 10 gms. of polyvinylpyrrolidone-iodine dissolved in 20 ml. of 70 percent alcohol is then added, and the stirring continues for 1 hour, and additional quantity of 39 gms. of talc is added in small increments and the whole set aside overnight. The solvents are removed to dryness under 2 mm/Hg pressure. The resultant amber colored powder comprises polyvinylpyrrolidone-iodine-hydrocortisone acetate molecular complex absorbed on talc and the active compound corresponds to polyvinylpyrrolidone-iodine-hydrocortisone acetate as a result of Example 1.

Other iodophor-steroid complex compounds may be prepared by utilizing the above described procedure and substituting stoichiometric equivalent weights of prednisone, prednisone acetate, prednisolone, prednisolone acetate, cortisone, cortisone acetate, and hydrocortisone for the hydrocortisone acetate described above. The respective iodophor-steroid compound prepared which is absorbed on the surface of the talc powder carrier corresponds to the product described in Example 2 above.

EXAMPLE 10

When it is desired to treat a dermatologic disease as for example, a contact dermatitis, atopic dermatitis, eczema, endogenous infective dermatitis, stasis dermatitis, lichen simplex chronicus, anogenital pruritis, intertrigo, bacterial and mycotic infections or other entities wherein an anti-inflammatory action is desired, then any of the products obtained as a result of Examples 1 through 9 above, may be applied to the skin of a human or animal presenting the symptoms of said dermatologic disease from one to six times daily, depending upon the patient's needs.

A prompt anti-inflammatory action occurs together with a germicidal action, which provide a rapid relief in painful symptomatology. Bacteriological tests of the affected skin surface reveals a significant degerming action to occur at the same time maximal anti-inflammatory activity is observed. The new preparations are free of local tissue irritation and are without stinging or burning actions such as would be expected when a conventional iodine germicidal preparation is applied to irritated skin. The subject preparations will not stain the skin and are readily removed by simple washing. A further advantage to the use of the above described preparation is that the treated area may be bandaged.

What is claimed is:

1. A germicidal anti-inflammatory pharmaceutical compound selected from the group consisting of polyvinylpyrrolidone-iodine-cortisone, polyvinylpyrrolidone-iodine-cortisone acetate, polyvinylpyrrolidone-iodine-hydrocortisone, polyvinylpyrrolidone-iodine-hydrocortisone acetate, polyvinylpyrrolidone-iodine-prednisone, polyvinylpyrrolidone-iodine-prednisone acetate, polyvinyl-pyrrolidone-iodine-prednisolone, polyvinylpyrrolidone-iodine-prednisolone acetate.

2. The compound of claim 1, said compound being polyvinylpyrrolidone-iodine cortisone.

3. The compound of claim 1, said compound being polyvinylpyrrolidone-iodine cortisone acetate.

4. The compound of claim 1, said compound being polyvinylpyrrolidone-iodine hydrocortisone.

5. The compound of claim 1, said compound being polyvinylpyrrolidone-iodine hydrocortisone acetate.

6. The compound of claim 1, said compound being polyvinylpyrrolidone-iodine prednisone.

7. The compound of claim 1, said compound being polyvinylpyrrolidone-iodine prednisone acetate.

8. The compound of claim 1, said compound being polyvinylpyrrolidone-iodine prednisolone.

9. The compound of claim 1, said compound being polyvinylpyrrolidone-iodine prednisolone acetate.

10. A pharmaceutical germicidal composition comprising the compound of claim 1 and a pharmaceutically acceptable carrier therefrom.

11. The pharmaceutical composition of claim 10, said compound being polyvinylpyrrolidone-iodine-hydrocortisone acetate.

12. The pharmaceutical composition of claim 10, said compound being polyvinylpyrrolidone-iodine cortisone.

13. The pharmaceutical composition of claim 10, said compound being polyvinylpyrrolidone-iodine cortisone acetate.

14. The pharmaceutical composition of claim 10, said compound being polyvinylpyrrolidone-iodine hydrocortisone.

15. The pharmaceutical composition of claim 10, said compound being polyvinylpyrrolidone-iodine prednisone.

16. The pharmaceutical composition of claim 10, said compound being polyvinylpyrrolidone-iodine prednisone acetate.

17. The pharmaceutical composition of claim 10, said compound being polyvinylpyrrolidone-iodine prednisolone.

18. The pharmaceutical composition of claim 10, said compound being polyvinylpyrrolidone-iodine prednisolone acetate.

19. A pharmaceutical germicidal anti-inflammatory composition comprising from one to ten parts by weight of polyvinylpyrrolidone-iodine and from one-tenth part to five parts by weight of a steroid compound selected from the group consisting of cortisone, cortisone acetate, hydrocortisone, hydrocortisone acetate, prednisone, prednisone acetate, prednisolone, prednisolone acetate and a pharmaceutically acceptable carrier therefor.

20. The pharmaceutical composition of claim 19, said pharmaceutically acceptable vehicle being selected from the group consisting of polyethylene glycols having a molecular weight of from 200 to 6000, glycerin and propylene glycol.

21. The method for preparing a compound of claim 1, comprising the steps of:
   a. dissolving 12 parts of polyvinylpyrrolidone-iodine in 50 parts of ethanol,
   b. warming and stirring to achieve complete solution,
   c. adding one part of a steroid compound selected from the group consisting of cortisone, cortisone acetate, hydrocortisone, hydrocortisone acetate, prednisone, prednisone acetate, prednisolone, prednisolone acetate,
   d. adjusting the pH of the mixture to be not less than pH 4 and not greater than pH 6,
   e. stirring, while warming, for a period of at least one hour,
   f. concentrating the solvent and isolating the formed polyvinylpyrrolidone-iodine-steroid molecular complex compound.

22. The method of claim 21, said steroid being cortisone and said polyvinylpyrrolidone-iodine steroid molecular complex compound isolated, being polyvinylpyrrolidone-iodine cortisone.

23. The method of claim 21, said steroid being cortisone acetate and said polyvinylpyrrolidone-iodine steroid molecular complex compound isolated, being polyvinylpyrrolidone-iodine cortisone acetate.

24. The method of claim 21, said steroid being hydrocortisone and said polyvinylpyrrolidone-iodine steroid molecular complex compound isolated, being polyvinylpyrrolidone-iodine hydrocortisone.

25. The method of claim 21, said steroid being prednisone and said polyvinylpyrrolidone-iodine steroid molecular complex compound isolated, being polyvinylpyrrolidone-iodine prednisone.

26. The method of claim 21, said steroid being prednisone acetate and said polyvinylpyrrolidone-iodine steroid molecular complex compound isolated, being polyvinylpyrrolidone-iodine prednisone acetate.

27. The method of claim 21, said steroid being prednisolone and said polyvinylpyrrolidone-iodine steroid molecular complex compound isolated, being polyvinylpyrrolidone-iodine prednisolone.

28. The method of claim 21, said steroid being prednisolone acetate and said polyvinylpyrrolidone-iodine steroid molecular complex compound isolated, being polyvinylpyrrolidone-iodine prednisolone acetate.

29. The method for synergistically augmenting the anti-inflammatory potency of a steroid compound which comprises combining from one to 10 parts by weight of polyvinylpyrrolidone-iodine with from one-tenth part to five parts by weight of a steroid compound selected from the group consisting of hydrocortisone, hydrocortisone acetate, cortisone, cortisone acetate, prednisone, prednisone acetate, prednisolone, prednisolone acetate and isolating the formed compound therefrom.

30. A method for treating inflammatory skin disease on the skin of a human or animal comprising applying from one to six times daily, a therapeutically sufficient quantity of a compound of claim 1 to said inflamed skin of said human or animal.

31. A method for treating inflammatory skin disease on the skin of a human or animal having said inflammatory skin disease complicated by infection comprising applying from one to six times daily, a therapeutically sufficient quantity of a composition of claim 19 to said inflamed skin of a human or animal.

* * * * *